Dec. 1, 1953
F. G. DAVIS
2,661,112
PORTABLE RIVET REMOVER AND SETTER
Filed Dec. 19, 1951
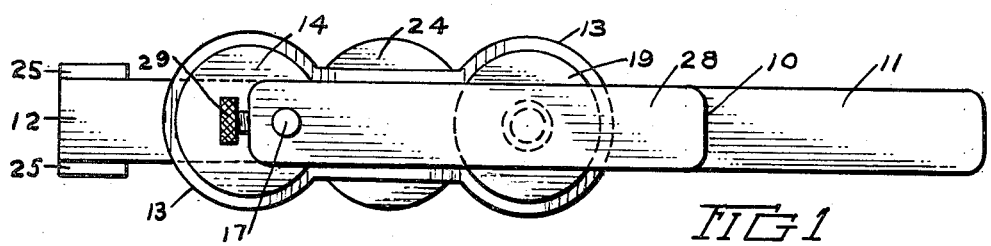
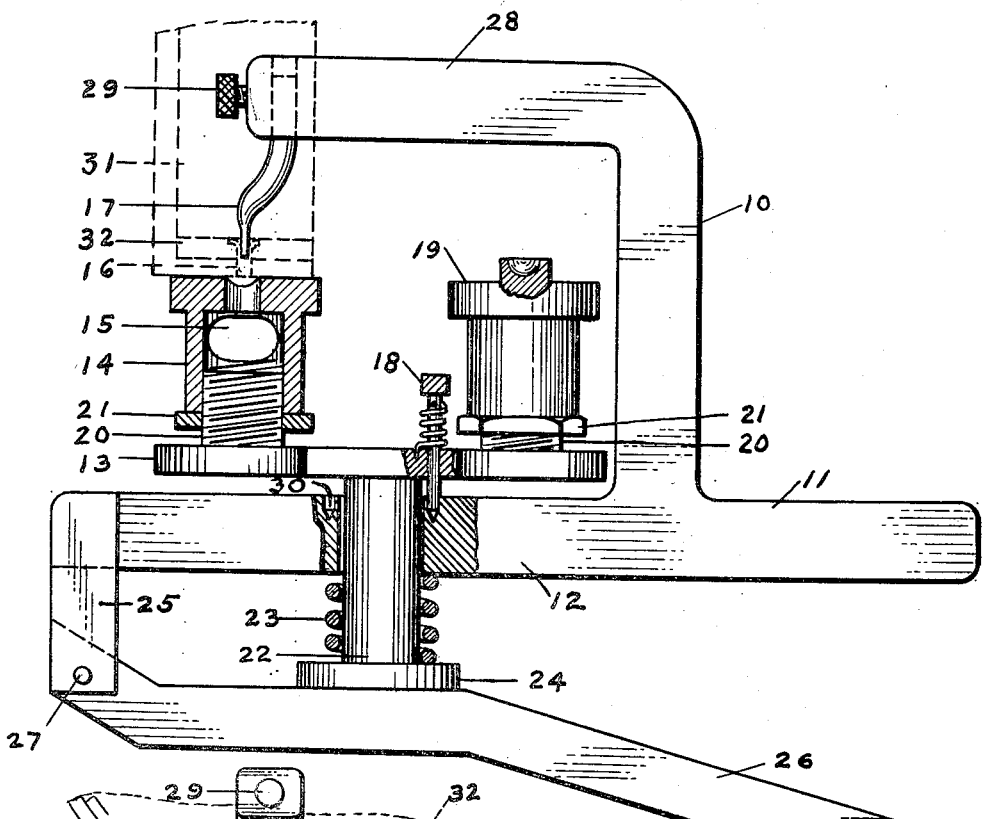
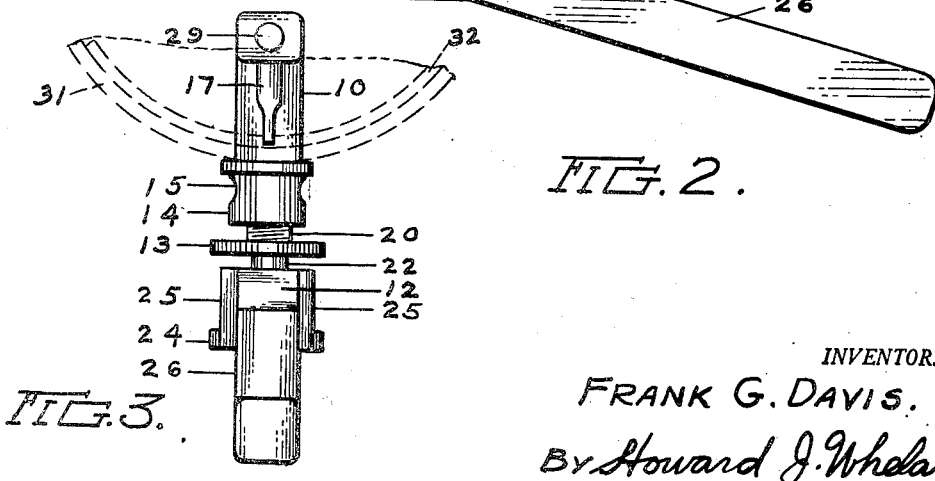
INVENTOR.
FRANK G. DAVIS.
By Howard J. Whelan.
ATTORNEY.

Patented Dec. 1, 1953

2,661,112

UNITED STATES PATENT OFFICE 2,661,112

PORTABLE RIVET REMOVER AND SETTER

Frank G. Davis, Baltimore, Md.

Application December 19, 1951, Serial No. 262,366

4 Claims. (Cl. 218—19)

This invention refers to automobile and truck brakes repair equipment and more particularly to a portable device for removing and replacing brake linings without removing the units from the automobile or truck.

In a particular system and method used for applying brake linings to automobiles and trucks the units are removed and taken to a shop where the rivet is punched out and the old lining removed and replaced with a new lining which is then riveted in place. This consumes considerable time and also requires that a machine shop or the like be available to complete the job.

To overcome this handicap this invention provides a portable clincher device that can be easily handled and can be used to remove the rivets and old linings and replace them with new linings and rivets without removing the units from the automobile or truck.

It is therefore an object of this invention to provide a new and improved combined rivet remover, punching and rivet setting device that will be portable and easily handled.

It is a further object of this invention to provide a portable riveting machine that will remove old rivets and set new rivets in a brake unit without removing same from an automobile or truck.

It is an additional object of this invention to provide a riveting machine having a plurality of die units for the removal of old rivets and linings and for holding and clamping new rivets in place to secure a new lining in vehicle brakes without removing same from the vehicle.

Additional objects will become apparent when the invention is more fully described.

In order to make the various features of the invention understandable, reference is made to the accompanying specification and drawings wherein a particular form of the invention is described and illustrated, and the operation and construction of the parts are more fully explained, while the scope of the invention is indicated in the claims.

In the drawings:

Figure 1 is a plan view of a portable rivet remover and setter, embodying this invention;

Figure 2 is a side elevation of Figure 1 with parts in section; and

Figure 3 is a front end view of Figure 1.

Similar reference numerals refer to similar parts throughout the drawings.

The drawings show a combination rivet remover and setter for the removal and application of brake linings to a vehicle and comprises a C frame 10 provided with a handle 11 at one side for holding and supporting the device during operation. The lower portion 12 of the frame, supports a rotatable plate 13 on which is mounted a rivet removing die 14 having a hole 15 at its side so that the discarded rivet 16 may be easily removed from the die after it has been pressed into it by the punch 17. The plate 13 is provided with a spring tensioned locking member 18 so that the rotatable plate 13 may be locked in a predetermined location, after the die 14 or 19 has been selected to suit the operation to be performed. The rotatable plate 13 is provided with threaded studs 20 and lock nuts 21 so that the dies 14 and 19 may be adjustably positioned thereon and locked in place. The rotatable plate 13 is supported by a shaft 22 mounted in the lower portion 12 of the frame and is tensioned by a spring 23 which presses against the lower side of the frame at one end while the other end of the spring presses against a collar 24 integral with shaft 22 and keeps the plate 13 biased downwardly. At the end of the lower side 12 of the frame opposite to the handle 11 is securely mounted a fork 25 that supports a raising bar 26 pivotally connected thereto by a pin 27. The upper bar 28 of the frame 10 supports a combined punch and rivet setter 17 which is adjustably attached and held thereto by a set screw 29.

In the operation of the device the die 14 is positioned under rivet setter 17 and the brake shoe 31 positioned on the die as shown in Figure 1, the operator holds the handle 11 in one hand and with his fingers draws up on the raising bar 26 and raises the plate 13 and die 14 and causes the rivet punch 17 to press down on the rivet 16 and removes it from the old lining 32 and it falls through the hole 15 and out of the way. A new lining is placed in the brake shoe 31 and the plate 13 is raised and the rivet setter and punch 17 cuts a hole in the lining to receive the new rivet. The plate 13 is then rotated until the die 19 is positioned under the punch 17 and the locking member 18 is positioned in hole 30 to hold it in that position. The raising bar 26 raises the die 19 and brake shoe 31 with its new lining and rivet until the rivet reaches the punch 17 where the hollow end of the rivet is turned over and securely binds and holds the brake lining in place.

While but one general form of the invention is shown in the drawings and described in the specification, it is not desired to limit this application for patent to this particular form, as it is appreciated that other forms of construction could be made that would use the same principles and come within the scope of the appended claims.

Having thus described the invention, what is claimed is:

1. A portable rivet removing and setting device comprising a C-shaped frame, a handle extension protruding from the lower leg of the C-shaped frame, a rivet remover and setter carried by the upper leg of the C-shaped frame and projecting downwardly therefrom, a raising bar pivoted to the lower leg of the frame and extending beneath and spaced from said lower leg, said lower leg having an opening therethrough, a shaft extending through said opening and rotatable therein, said shaft having an abutment at its lower end resting on the aforesaid raising bar, said shaft having a plate at its upper end extending above the lower leg of the frame, a spring surrounding the shaft and biasing the plate downwardly, a threaded stud carried by the plate in alignment with the rivet setter and remover, and a die adjustable on said stud, whereby said plate and die are movable towards the rivet setter and remover upon movement of the raising bar toward the handle.

2. A device as set forth in claim 1 including means for locking the plate to the lower leg of the frame, said means consisting of a spring-urged pin carried by the plate, the lower leg of the frame having openings therein to selectively receive the lower end of the pin.

3. A device as set forth in claim 1 wherein the plate extends on opposite sides of the longitudinal axis of the shaft, a second threaded stud carried by said plate equidistantly from the said axis with the first mentioned stud, and a second die adjustably mounted on said second stud.

4. A device as set forth in claim 3 including means for locking the plate to the lower leg of the frame, the locking means consisting of a spring-urged pin carried by the locking plate, the lower leg of the frame having openings therein to selectively receive the lower end of the pin.

FRANK G. DAVIS.

References Cited in the file of this patent
UNITED STATES PATENTS

| Number | Name | Date |
|---|---|---|
| 676,827 | Williams | June 18, 1901 |
| 1,130,121 | Thrasher | Mar. 2, 1915 |
| 1,185,776 | Coombs | June 6, 1916 |
| 1,809,322 | Warner | June 9, 1931 |